Aug. 2, 1927.

C. A. COMSTOCK 1,637,765

PISTON AND CONNECTING ROD CONSTRUCTION

Filed Aug. 31, 1926   2 Sheets-Sheet 1

Inventor
C. A. Comstock
By Watson E. Coleman
Attorney

Aug. 2, 1927.
C. A. COMSTOCK
1,637,765
PISTON AND CONNECTING ROD CONSTRUCTION
Filed Aug. 31, 1926        2 Sheets-Sheet 2
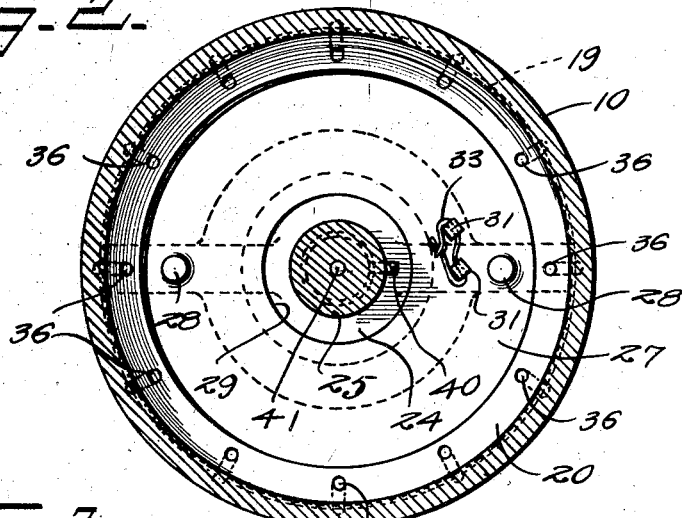
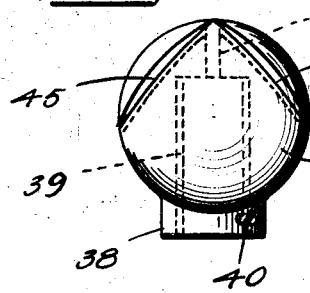
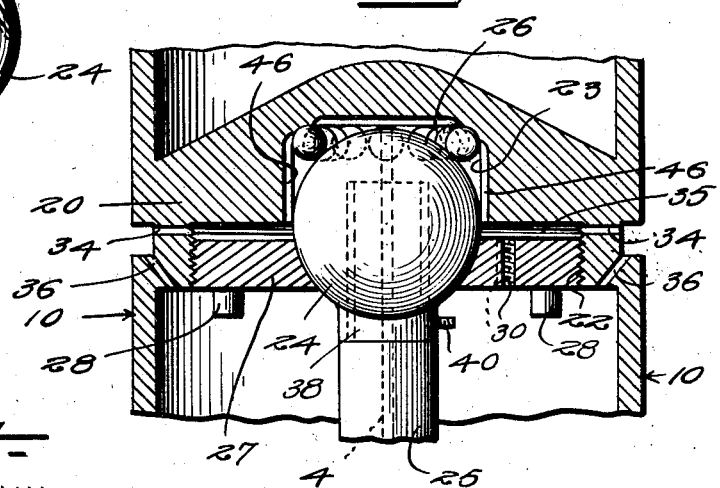
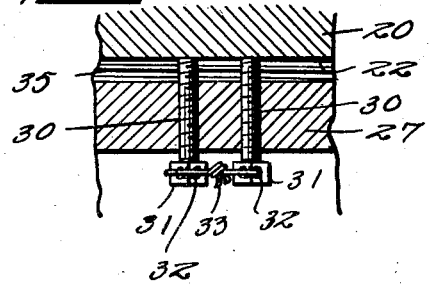
Inventor
C. A. Comstock.
By Watson E. Coleman
Attorney Patented Aug. 2, 1927.

1,637,765

UNITED STATES PATENT OFFICE.

CHARLIE A. COMSTOCK, OF FULLERTON, CALIFORNIA.

PISTON AND CONNECTING-ROD CONSTRUCTION.

Application filed August 31, 1926. Serial No. 132,876.

This invention relates to piston and connecting rod constructions.

An important object of the invention is the provision of a piston and connecting rod construction, permitting universal movement of the piston upon the upper end of the connecting rod and further permitting rotation of the piston, so that the piston will be worn evenly and will not become lopsided or scored as with the usual construction.

A further object of the invention is to provide a construction wherein the pivotal connection between the piston and connecting rod is thoroughly lubricated and protected from the heat to which the pistons of internal combustion engines are continuously submitted.

A further object of the invention is to provide a novel and improved mounting for a spherical head at the upper end of the connecting rod and means for mounting this head in the piston, such that proper lubrication can be had and an adjustable connection at the same time is provided.

A further object of the invention is to provide a piston construction preventing carbon from collecting about the ring of the piston.

These and other objects I attain by the construction shown in the accompanying drawings, wherein for the purpose of illustration is shown a preferred embodiment of my invention and wherein:—

Figure 2 is a section on the line 2—2 of Figure 1;

Figure 3 is a side elevation of the spherical head of the connecting rod;

Figure 4 is an enlarged sectional view showing the manner of locking the disk against movement;

Figure 5 is a sectional view of a slightly modified manner of socketing the piston.

Figure 1:
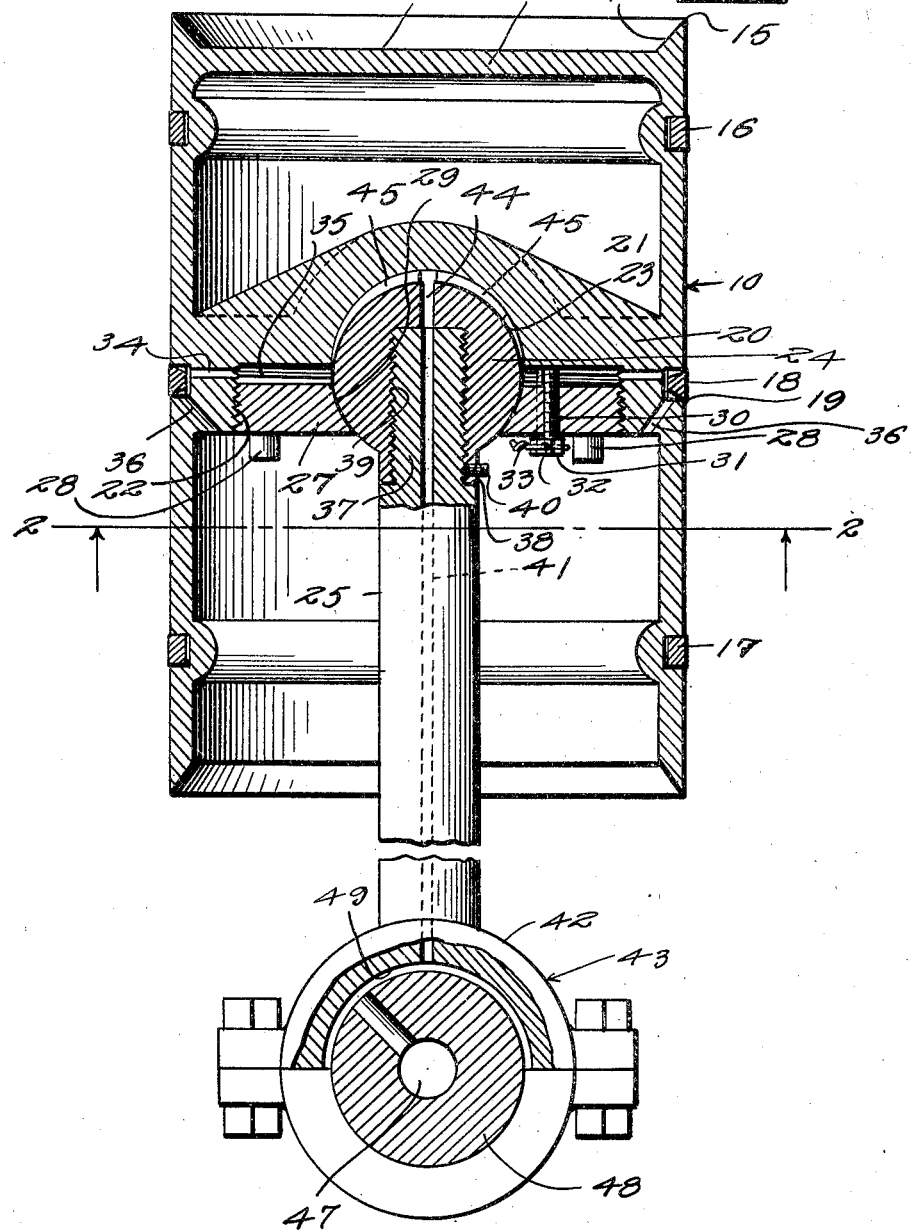
Figure 1 is a vertical sectional view through a piston and rod, the piston and rod being constructed in accordance with my invention.

Referring now more particularly to the drawings, the numeral 10 indicates the cylindrical wall of a piston and 11 the head thereof. This head 11 has its upper face relieved, as at 13, the relief providing a sloping wall 14 extending inwardly and downwardly from the outer face of the piston and producing an upwardly directed knife edge 15, the function of which is to prevent the passage of carbon to the upper ring 16 of the piston about which it usually collects. In addition to the upper ring 16, the outer wall of the piston has a lower ring 17 and an intermediate ring 18. The ring 18, as illustrated, is preferably an oil ring of that type collecting oil from the wall of the piston and directing it into the ring groove 19.

At a point well spaced from the under surface of the head 11 and in alignment with the ring groove 19, a horizontal wall 20 connects the walls of the piston and combines with the head and walls of the piston to produce beneath the head a dead air space 21. The lower face of this wall is provided with a threaded bore 22 concentric with the piston and at the upper end of this bore a recess 23 likewise concentric with the piston is formed. This recess may be substantially semi-spherical, as illustrated in Figure 1, for coaction with a spherical head 24 of a connecting rod 25 or may be shaped, as shown in Figure 5, so as to receive both the head and a ball thrust bearing 26. Threaded within the bore 22 is a disk 27, the under surface of which is provided with lugs 28 or similar means whereby it may be engaged for rotation. This disk is formed at its axis with an opening 29, the walls of which are shaped to coact with the spherical head 24 and maintain the same in proper position within the recess 23. In event of wear upon the head 24, the slack produced may be taken up by the adjustment of the disk 27. In order to hold the disk 27 in adjusted positions, this disk is provided with a pair of adjacent threaded openings 30 through which are provided set-screws 31, the heads of which are perforated at 32 for the passage of a lock wire 33. The inner ends of these screws abut against the upper end wall of the bore 22 and thus serve to lock the disk in its adjusted positions. In the ring groove 19, ports 34 radial to the piston extend inwardly to the space 35 between the upper end of the bore and the adjacent face of the disk 27. Other ports 36 extend downwardly and inwardly from the groove 19 to the interior of the piston.

The connecting rod 25 is connected with the spherical head 24 by providing upon the connecting rod a reduced threaded extension 37 forming upon the spherical head a neck 38 having an axial threaded bore 39 which is extended well into the head. Through this neck a set-screw 40 may be directed for securing the spherical head against rotation with relation to the rod 25. The rod 25 has an axial bore 41 which opens through the lower face of the upper bearing section 42 of the lower connecting rod bearing 43. The head 24 is provided with a port 44 co-axial with the bore 39 and opening through the upper end of the head. Where the semi-spherical socket 23 is provided, the head may be provided with grooves 45 which will distribute oil and place the port 44 in communication with the space 35 and accordingly with the ring groove 19. Where the ball bearing thrust is employed, these grooves must be formed in the walls of the socket 23, as indicated at 46.

It will be obvious that a construction of this character may be employed with either splash or force feed lubrication. Where force feed lubrication is employed, oil conducted through a port 47 of the hollow crank shaft 48 will pass through grooves 49 formed in the bearing 43 to the lower end of the port 41. It will be forced up this port and through the port 44 to lubricate the bearings of the head 24 and to pass into the space 35. From this space, it will pass to the ring groove 19 through the ports 34 and from the ring groove 19 is returned to the base through the ports 36. At the same time, excess lubricant upon the walls of the cylinder will be removed by the ring 18 and returned to the base. Where the splash system of lubrication is employed, oil collected by the ring 18 will pass through the ports 34 to the space 35 and from this space will pass to the port 44 and finally to the port 41, thus not only lubricating the spherical head 24 but the bearing 43. Carbonization or gumming of the lubricant in the space 35 and about the spherical head 24 is prevented by the insulation provided by the space 21.

It will be obvious that the construction hereinbefore set forth is capable of a certain range of change and modification and I accordingly do not limit myself to such specific structure except as hereinafter claimed.

I claim:—

1. In combination, a piston having a bearing, a connecting rod having a head at its upper end mounted in the bearing in the piston, and a bearing at its lower end for engagement with the crank shaft, a port connecting the faces of said bearings, a ring groove in the exterior of the piston, a connection between said ring groove and the bearing of the piston and a further connection between said ring groove and the interior of the piston.

2. In combination, a piston having a bearing, a connecting rod having a head at its upper end mounted in the bearing in the piston, a bearing at its lower end for engagement with the crank shaft, a port connecting the faces of said bearings, a ring groove in the exterior of the piston, a connection between said ring groove and the bearing of the piston, a further connection between said ring groove and the interior of the piston and a ring within said groove collecting lubricant from the walls of the cylinder and delivering it to the space between the inner face of the ring and the groove.

3. In combination, a piston having a bearing, a connecting rod having a head at its upper end mounted in the bearing in the piston, a bearing at its lower end for engagement with the crank shaft, a port connecting the faces of said bearings, a ring groove in the exterior of the piston, the bearing of the piston being formed in two sections providing therebetween a chamber, grooves placing the port of the connecting rod in communication with said chamber, ports connecting the chamber and the ring groove and ports connecting the ring groove with the interior of the piston.

4. In combination, a piston having a bearing, a connecting rod having a head at its upper end mounted in the bearing in the piston, a bearing at its lower end for engagement with the crank shaft, a port connecting the faces of said bearings, a ring groove in the exterior of the piston, the bearing of the piston being formed in two sections providing therebetween a chamber, grooves placing the port of the connecting rod in communication with said chamber, ports connecting the chamber and the ring groove, ports connecting the ring groove with the interior of the piston and a ring within said groove collecting lubricant from the walls of the cylinder and delivering it to the space between the inner face of the ring and groove.

5. In combination, a piston having a bearing, a connecting rod having a head at its upper end mounted in the bearing in the piston, a bearing at its lower end for engagement with the crank shaft, a port connecting the faces of said bearings, a ring groove in the exterior of the piston, the bearing of the piston being formed in two sections providing therebetween a chamber, grooves placing the port of the connecting rod in communication with said chamber, ports connecting the chamber and the ring groove, ports connecting the ring groove with the interior of the piston, one section of the bearing of the piston beng integral wth the piston and being formed at the upper end of an axial bore formed in the piston, the other section having threaded adjustment in the bore and means extending through said other section and engaging the inner end wall of the bore for maintaining said other section in adjusted position.

6. In combination, a piston having a bearing, a connecting rod having a head at its upper end mounted in the bearing in the piston, a bearing at its lower end for engagement with the crank shaft, a port connecting the faces of said bearings, a ring groove in the exterior of the piston, the bearing of the piston being formed in two sections providing therebetween a chamber, grooves placing the port of the connecting rod in communication with said chamber, ports connecting the chamber and the ring groove, ports connecting the ring groove with the interior of the piston, one section of the bearing of the piston being integral with the piston and being formed at the upper end of an axial bore formed in the piston, the other section having threaded adjustment in the bore and means extending through said other section and engaging the inner end wall of the bore for maintaining said other section in adjusted position, said piston having at a point spaced from the head thereof a wall in which said bore is formed, the space between the piston head and said wall being sealed.

In testimony whereof I hereunto affix my signature.

CHARLIE A. COMSTOCK.